United States Patent
Collier-Hallman et al.

(10) Patent No.: US 6,949,901 B1
(45) Date of Patent: Sep. 27, 2005

(54) SYSTEM AND METHOD FOR CONTROLLING A STEERING POSITION OF REAR VEHICLE WHEELS

(75) Inventors: Steven J. Collier-Hallman, Frankenmuth, MI (US); Reeny T. Sebastian, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/929,603

(22) Filed: Aug. 30, 2004

(51) Int. Cl.⁷ ............................................. H02F 7/00
(52) U.S. Cl. .................. 318/432; 318/434; 318/727; 318/254; 318/500; 701/41; 180/443
(58) Field of Search .................. 318/432–434, 318/254, 727, 500, 459; 180/410, 412, 415, 180/422; 701/41, 42, 43

(56) References Cited

U.S. PATENT DOCUMENTS

| | | | | |
|---|---|---|---|---|
| 5,101,922 A | * | 4/1992 | Ohmura | 180/445 |
| 5,417,299 A | * | 5/1995 | Pillar et al. | 180/412 |
| 5,508,921 A | * | 4/1996 | Chikuma et al. | 701/41 |
| 5,810,108 A | * | 9/1998 | Jung et al. | 180/404 |
| 5,992,556 A | * | 11/1999 | Miller | 180/446 |
| 6,308,123 B1 | * | 10/2001 | Ikegaya et al. | 701/41 |
| 6,373,211 B1 | | 4/2002 | Henry et al. | 318/432 |
| 6,465,975 B1 | | 10/2002 | Naidu | 318/430 |
| 6,498,449 B1 | | 12/2002 | Chen et al. | 318/434 |
| 6,498,451 B1 | | 12/2002 | Boules et al. | 318/661 |
| 6,564,131 B2 | | 5/2003 | Sebastian et al. | 701/41 |
| 6,640,172 B2 | | 10/2003 | Sebastian et al. | 701/41 |
| 2002/0167242 A1 | | 11/2002 | Liu et al. | 310/184 |

* cited by examiner

Primary Examiner—Rina Duda
(74) Attorney, Agent, or Firm—Michael D. Smith

(57) ABSTRACT

A system and a method for controlling a steering position of at least one rear wheel of a vehicle are provided. The vehicle has both a brushless electric motor with a plurality of electrical phase windings and a steering actuator. The brushless electric motor has a rotor configured to drive the steering actuator. The steering actuator is operably coupled to at least one rear vehicle wheel. The method includes determining a desired voltage value indicative of about one-half of a peak-to-peak voltage to be applied to each of the plurality of electrical phase windings of the brushless electric motor based on a desired rear vehicle wheel steering angle and a measured rear vehicle wheel steering angle. The method further includes determining when the desired voltage value is greater than a threshold voltage level. The method further includes calculating a phase advance angle based on at least the desired voltage value and the threshold voltage level. The method further includes phase advancing a plurality of voltage waveforms applied to the plurality of electrical phase windings, wherein each phase advanced voltage waveform is phase advanced an amount substantially equal to the phase advance angle, wherein phase advancing the voltage waveforms increases a speed of the rotor at a desired torque to thereby increase a speed at which the steering actuator moves at least one rear vehicle wheel toward the desired rear vehicle wheel steering angle.

20 Claims, 7 Drawing Sheets

SYSTEM AND METHOD FOR CONTROLLING A STEERING POSITION OF REAR VEHICLE WHEELS

TECHNICAL FIELD

The present application relates to a system and a method for controlling a steering position of at least one rear vehicle wheel.

BACKGROUND

In vehicular applications, a typical four-wheel steering system steers the front and the rear wheels of a vehicle. The four-wheel steering system includes a front wheel steering system for steering a set of front wheels and a rear wheel steering system for steering a set of rear wheels. The rear wheel steering system utilizes a motor that induces movement of the rear wheels about vertical wheel axes.

However, a speed of the motor and a resulting speed that the rear wheels are moved about the wheel axes, can be limited by the voltage supplied by a voltage source to the motor. Thus, when a commanded voltage for a motor is greater than that which can be supplied by the voltage source, the motor moves the rear wheels at a speed limited by the voltage supplied by the voltage source to the motor.

Thus, there is a need for a rear wheel steering system that can increase a speed at which a motor moves the rear wheels of a vehicle at a desired torque.

SUMMARY

A method for controlling a steering position of at least one rear wheel of a vehicle in accordance with an exemplary embodiment is provided. The vehicle has both a brushless electric motor with a plurality of electrical phase windings and a steering actuator. The brushless electric motor has a rotor configured to drive the steering actuator. The steering actuator is operably coupled to at least one rear vehicle wheel. The method includes determining a desired voltage value indicative of about one-half of a peak-to-peak voltage to be applied to each of the plurality of electrical phase windings of the brushless electric motor based on a desired rear vehicle wheel steering angle and a measured rear vehicle wheel steering angle. The method further includes determining when the desired voltage value is greater than a threshold voltage level. The method further includes calculating a phase advance angle based on at least the desired voltage value and the threshold voltage level. The method further includes phase advancing a plurality of voltage waveforms applied to the plurality of electrical phase windings, wherein each phase advanced voltage waveform is phase advanced an amount substantially equal to the phase advance angle, wherein phase advancing the voltage waveforms increases a speed of the rotor at a desired torque to thereby increase a speed at which the steering actuator moves at least one rear vehicle wheel toward the desired rear vehicle wheel steering angle.

A system for controlling a steering position of at least one rear wheel of a vehicle in accordance with another exemplary embodiment is provided. The system includes a brushless electric motor having a plurality of electrical phase windings and a rotor. The system further includes an actuator operably coupled to the brushless electric motor, wherein the actuator is configured to move at least one rear vehicle wheel in response to rotation of the rotor of the brushless electric motor. The system further includes an inverter circuit configured to energize the plurality of electrical phase windings in the brushless electric motor. The system further includes a controller operably coupled to the inverter circuit. The controller is configured to determine a desired voltage value indicative of about one-half of a peak-to-peak voltage to be applied to each of the plurality of electrical phase windings of the brushless electric motor based on a desired rear vehicle wheel steering angle and a measured rear vehicle wheel steering angle. The controller is further configured to determine when the desired voltage value is greater than a threshold voltage level. The controller is further configured to calculate a phase advance angle based on at least the desired voltage value and the threshold voltage level. The controller is further configured to induce the inverter circuit to phase advance a plurality of voltage waveforms applied to the plurality of electrical phase windings, wherein each phase advanced voltage waveform is phase advanced an amount substantially equal to the phase advance angle, wherein phase advancing the voltage waveforms increases a speed of the rotor at a desired torque to thereby increase a speed at which the steering actuator moves at least one rear vehicle wheel toward the desired rear vehicle wheel steering angle.

An article of manufacture in accordance with another exemplary embodiment is provided. The article of manufacture includes a computer storage medium having a computer program encoded therein for controlling a steering position of at least one rear wheel of a vehicle. The vehicle has both a brushless electric motor with a plurality of electrical phase windings and a steering actuator. The brushless electric motor has a rotor configured to drive the steering actuator. The steering actuator is operably coupled to at least one rear vehicle wheel. The computer storage medium includes code for determining a desired voltage value indicative of about one-half of a peak-to-peak voltage to be applied to each of the plurality of electrical phase windings of the brushless electric motor based on a desired rear vehicle wheel steering angle and a measured rear vehicle wheel steering angle. The computer storage medium further includes code for determining when the desired voltage value is greater than a threshold voltage level. The computer storage medium further includes code for calculating a phase advance angle based on at least the desired voltage value and the threshold voltage level. The computer storage medium further includes code for phase advancing a plurality of voltage waveforms applied to the plurality of electrical phase windings, wherein each phase advanced voltage waveform is phase advanced an amount substantially equal to the phase advance angle, wherein phase advancing the voltage waveforms increases a speed of the rotor at a desired torque to thereby increase a speed at which the steering actuator moves at least one rear vehicle wheel toward the desired rear vehicle wheel steering angle.

DETAILED DESCRIPTION OF EXEMPLARY EMBODIMENTS

Figure 1:
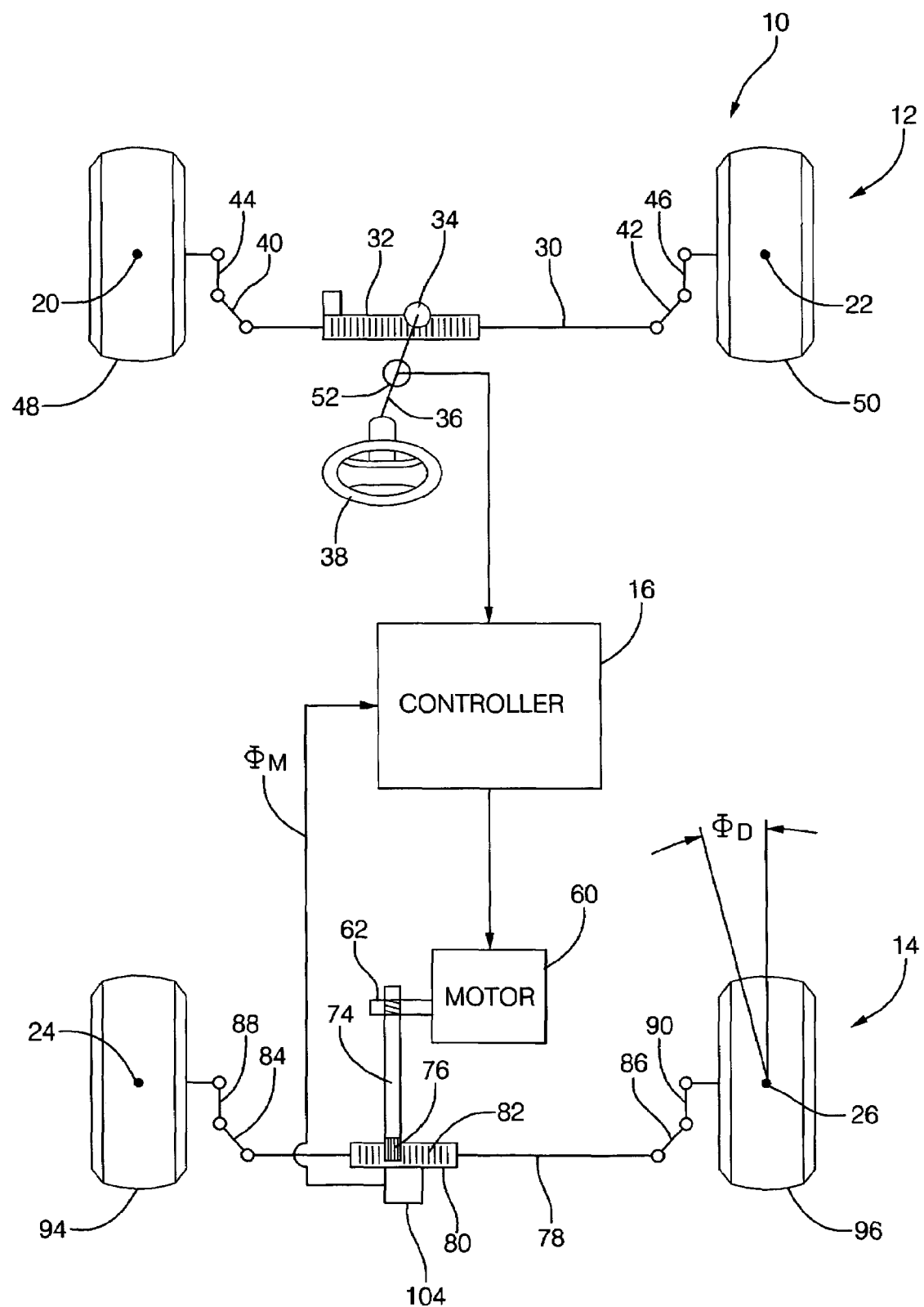
FIG. 1 is a schematic of a vehicle having a front steering system and a rear steering system.

Referring to FIG. 1, a vehicle 10 is illustrated having a front steering system 12, a rear steering system 14, and a control computer 16. The vehicle 10 utilizes both the front steering system 12 and the rear steering system 14 to steer the wheels of vehicle 10. In the illustrated embodiment, the front and rear steering systems 12, 14 have a rack and pinion steering configuration. In alternate embodiments, the vehicle 10 can have other steering configurations including an integral gear steering configuration, for example.

The front steering system 12 is provided to control a steering direction of the front wheels 48, 50. The system 12 includes a rack shaft 30, a steering rack 32, a pinion gear 34, a steering column 36, a steering wheel 38, tie rods 40, 42, knuckle arms 44, 46, front vehicle wheels 48, 50, and a steering column position sensor 52. The rack shaft 30 is operably coupled to tie rods 40, 42 at opposite ends of the rack shaft 30. The rack shaft 30 includes a steering rack 32 operably coupled to a pinion gear 34. The pinion gear 34 is operably coupled to a steering column 36 that is rotated via a steering wheel 38. The tie rod 40 is operably coupled to the knuckle arm 44 that is further operably coupled to the vehicle wheel 48. The tie rod 42 is operably coupled to the knuckle arm 46 that is further coupled to the vehicle wheel 50.

When the steering wheel 38 is rotated in a first rotational direction, the steering column 36 urges the pinion gear 34 to move the steering rack 32 in a first linear direction relative to a body of the motor vehicle 10. In response, the tie rods 40, 42 and the knuckle arms 44, 46 induce the vehicle wheels 48, 52 to turn in a first direction about steering axes 20, 22 associated with the vehicle wheels 48, 52, respectively. Alternately, when the steering wheel 38 is rotated in a second rotational direction, the steering column 36 urges the pinion gear 34 to move the steering rack 32 in a second linear direction, opposite the first linear direction, relative to the body of the motor vehicle 10. In response, the tie rods 40, 42 and the knuckle arms 44, 46 induce the vehicle wheels 48, 52 to turn in a second direction about steering axes 20, 22 associated with the vehicle wheels 48, 52, respectively.

The steering column sensor 52 is operably coupled to the steering column 36 and is provided to generate a signal indicative of a desired front vehicle wheel steering angle and a desired rear vehicle wheel angle ($\Phi_D$). Of course the desired rear vehicle wheel steering angle can have a different value than the front vehicle wheel steering angle depending upon a vehicle speed, a desired roll angle of the vehicle, and a desired yaw angle of the vehicle.

The rear steering system 14 is provided to control a steering direction of the rear wheels 94, 96. The system 14 includes a motor 60, a drive mechanism 74, a pinion 76, a rack shaft 78, a steering rack 80, a rear wheel alignment spring 82, tie rods 84, 86, knuckle arms 88, 90, vehicle wheels 94, 96, a voltage source 98, an inverter circuit 100, a motor position and velocity sensor 102, and a rear wheel steering angle sensor 104.

Figure 3:
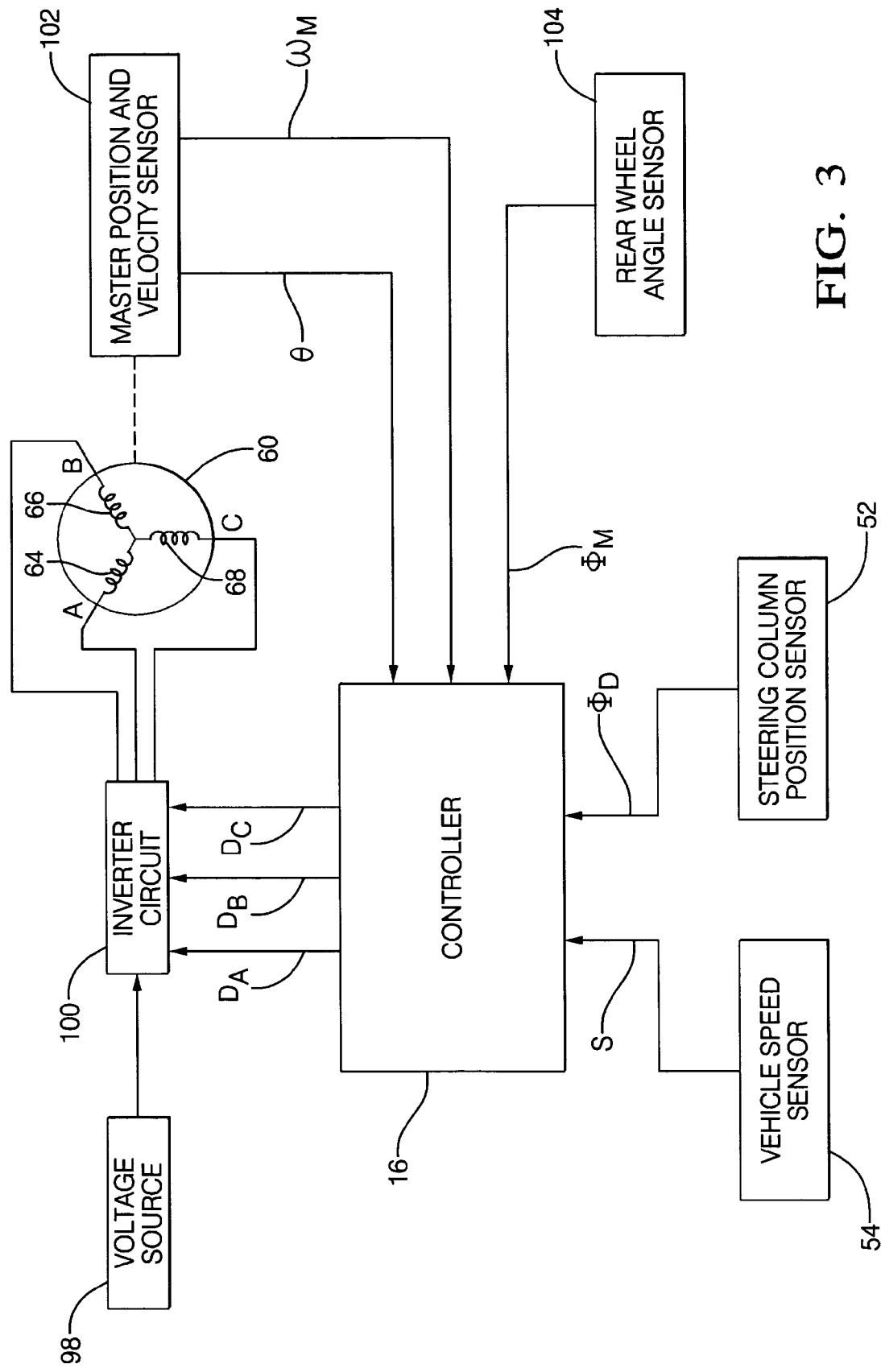
FIG. 3 is a block diagram of a portion of the rear steering system of the vehicle.

Referring to FIGS. 1 and 3, the motor 60 is controlled to provide a desired torque for rotating the rear vehicle wheels 94, 96 to a desired rear vehicle wheel steering angle ($\Phi_D$). The motor 60 comprises a 3-phase brushless electrical motor. Of course, in alternate embodiments, the number of electrical phases of the motor 60 could be less than or greater than 3-phases. Further, in alternate embodiments the motor 60 could comprise other types of electrical motors, such as a switched-reluctance motor for example. The motor 60 includes a motor shaft 62, and phase windings 64, 66, 68 operably coupled together in a Y-configuration. As shown, the motor 60 is operably coupled to an inverter circuit 100. The inverter circuit 100 energizes the phase windings 64, 66, 68 by pulse-width modulating three sinusoidal voltage waveform applied to phase windings 64, 66, 68 to induce the motor shaft 62 to rotate in either a first rotational direction or a second rotational direction opposite the first rotational direction. The controller 16 is operably coupled to the inverter circuit 100 and induces the inverter circuit 102 to generate the pulse-width modulation signals, as will be explained in greater detail below.

Figure 2:
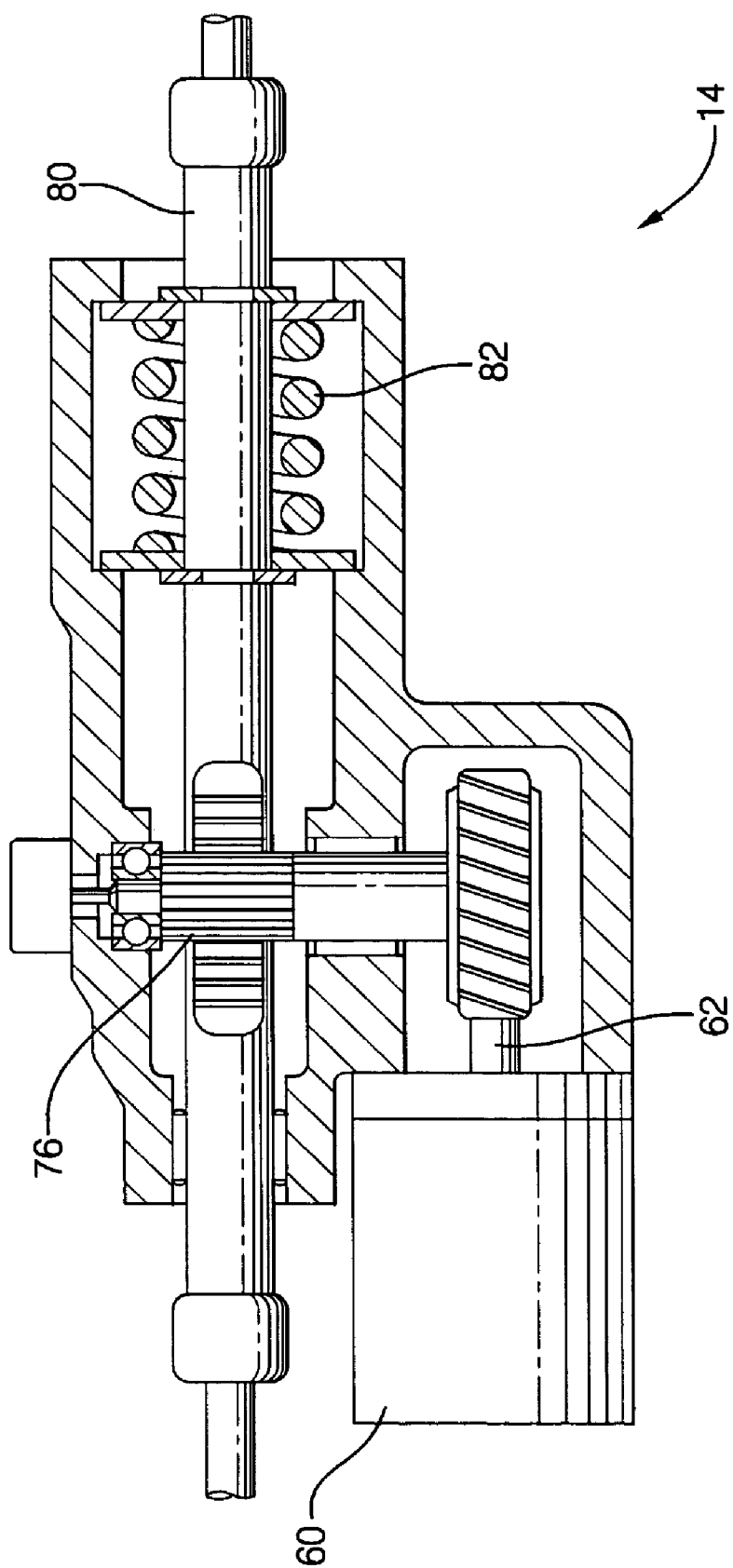
FIG. 2 is a schematic of a portion of the rear steering system of the vehicle.

Referring to FIGS. 1 and 2, the rotor 62 of motor 60 is operably coupled to the drive mechanism 74. The drive mechanism 74 through the pinion 76 transfers the rotational motion of the rotor shaft 62 to a linear motion of the steering rack 80 and the rack shaft 78. The rack shaft 78 is operably coupled to the tie rods 84, 86 that are further operably coupled to the knuckle arms 88, 90, respectively. The knuckle arms 88, 90 are operably coupled to the rear vehicle wheels 94, 96 respectively. When the motor shaft 62 rotates in a first rotational direction, the rack shaft 78 is moved in a first linear direction relative to a body of the motor vehicle 10. In response, the tie rods 84, 86 and the knuckle arms 88, 90 induce the vehicle wheels 94, 96, respectively, to turn in a first predetermined direction about steering axes 24, 26, respectively, associated with the vehicle wheels 94, 96, respectively, toward a desired rear vehicle wheel steering angle ($\Phi_D$). Alternately, when the motor shaft 62 rotates in a second rotational direction, the rack shaft 78 is moved in a second linear direction, opposite the first linear direction, relative to a body of the motor vehicle 10. In response, the tie rods 84, 86 and the knuckle arms 88, 90 induce the vehicle wheels 94, 96, respectively, to turn in a second predetermined direction about steering axes 24, 26, respectively, associated with the vehicle wheels 94, 96, respectively, toward a desired rear vehicle wheel steering angle ($\Phi_D$).

The rear wheel alignment spring 82 is operably coupled to the steering rack 80 and provides a force that returns the rear steering rack 80 to a center, or neutral position under certain conditions in the rear steering system 14. The return spring 82 is disposed in the steering rack 80 with a bi-directional preload. The preload is configured to urge the steering rack 82 to the center position when the motor 60 is not maintaining a particular position. It should be noted that when the rear steering rack 80 is displaced from the center position, the force required to displace the rear steering rack 80 is not directionally symmetrical. That is, a displacement in the direction of further compression of the alignment spring 82 (e.g. against the alignment spring 82) will require additional force, as the displacement is opposed by the spring force of the spring 82. Alternately, a displacement in the direction of extension of the alignment spring 82 (e.g. with the alignment spring 82) will require less force, as the displacement is aided by the spring force of spring 82.

Referring to FIG. 3, the motor position and velocity sensor 102 is provided to generate: (i) a first signal indicative of an electrical phase position ($\theta$) of at least one phase winding of the motor 60, and (ii) a second signal indicative of a rotational speed ($\omega m$) of the rotor 62. The sensor 102 transmits the first and second signals to the controller 16.

The rear wheel steering angle sensor 104 is provided to generate a signal indicative of a measured rear vehicle wheel steering angle ($\Phi_M$). As shown, the sensor 104 is operably coupled to the steering rack 80 and to the controller 16.

The vehicle speed sensor 54 is provided to generate a signal indicative of a vehicle speed that is recovered by the controller 16.

The voltage source 98 is operably coupled to the inverter circuit 100 and supplies a predetermined DC voltage to the inverter circuit 100. In one embodiment, the voltage source 98 comprises a car battery generating a 12 VDC voltage. Of course, in alternate embodiments, the voltage source 98 could produce a voltage is greater than or less than 12 Vdc.

The controller 16 provides control signals to the front steering system 12 and to the rear steering system 14 to control a steering direction of the front vehicle wheels 48, 50, and the rear vehicle wheels 94, 96. The controller 16 is operably coupled to the inverter circuit 100, the motor position and velocity sensor 102, the rear wheel steering angle sensor 104, and the steering column position sensor 52. In particular, the controller 16 receives a signal indicative of the electrical phase position (θ) and a signal indicative of the motor rotational speed (ωm) from the sensor 102, a signal indicative of the measured vehicle wheel steering angle ($\Phi_M$) from the sensor 104, and a signal indicative of the desired vehicle wheel steering angle ($\Phi_D$) from the sensor 52. The controller 16 generates control signals for controlling the motor 60 utilizing: (i) the motor rotational speed (ωm), (ii) the measured vehicle wheel angle ($\Phi_M$), (iii) the desired vehicle wheel angle ($\Phi_D$), as will be discussed in greater detail below.

Figure 4:
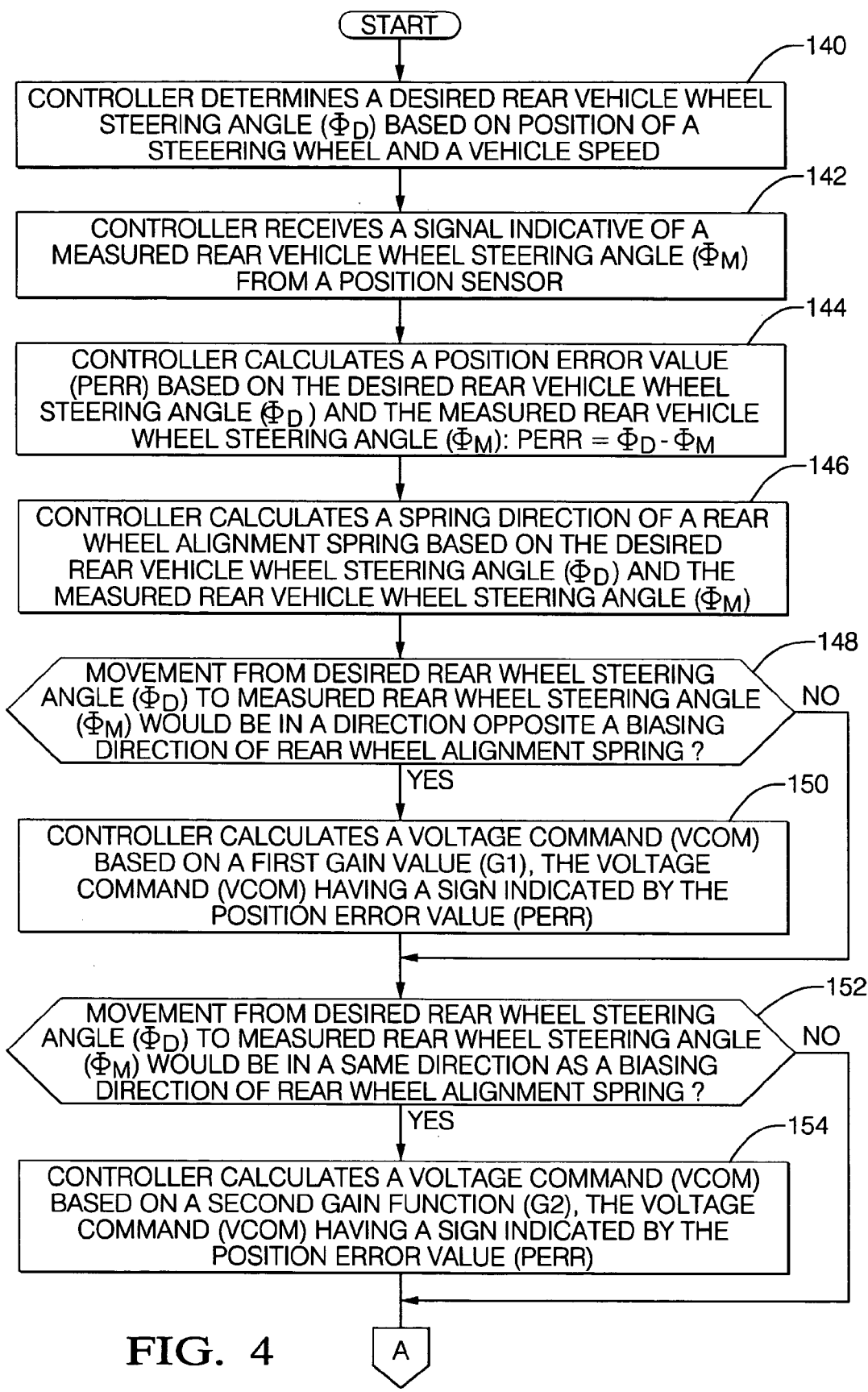
FIGS. 4–6 are flowcharts of a method for controlling a steering position of the least one rear wheel of the vehicle.
Figure 5:
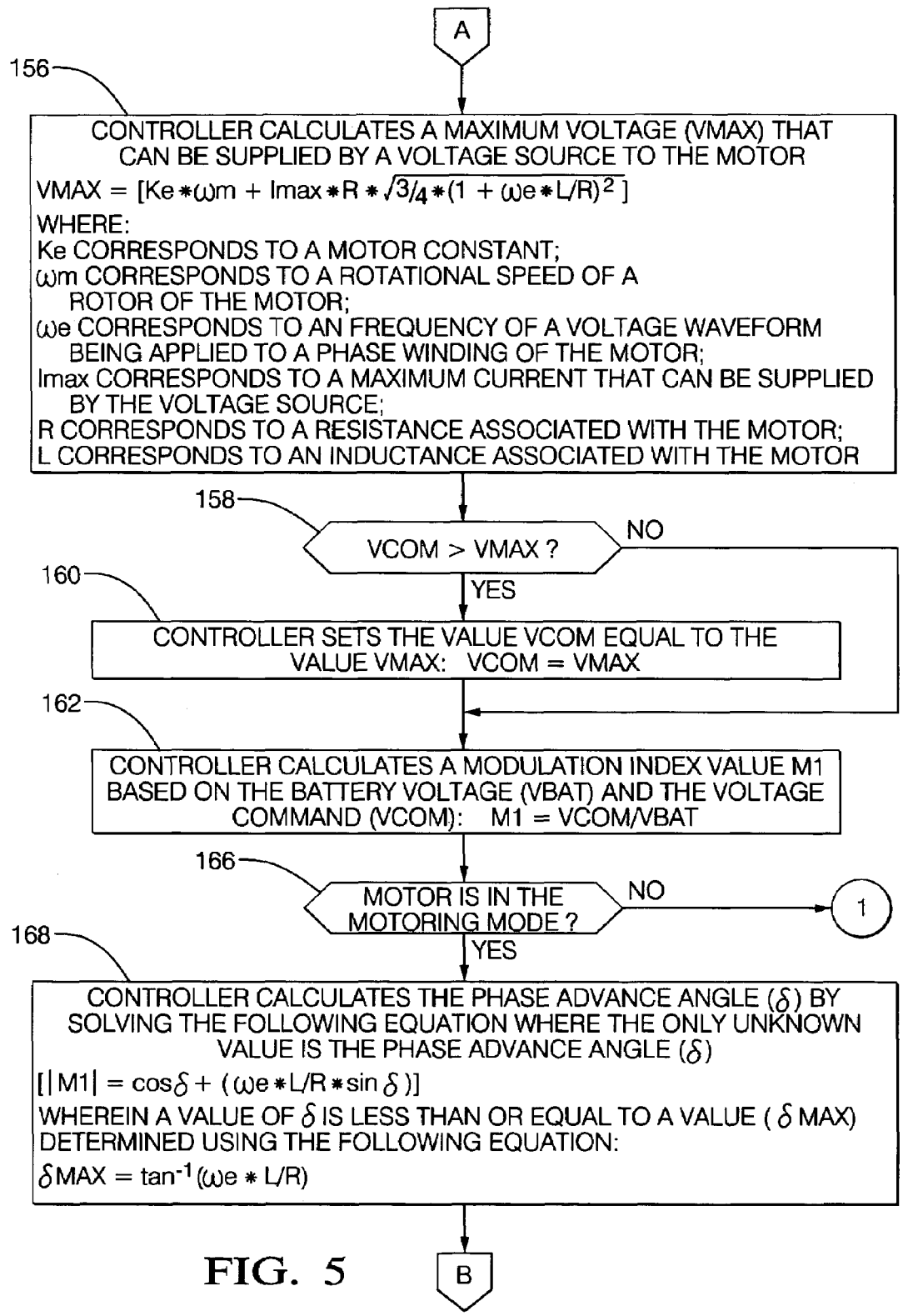
Figure 6:
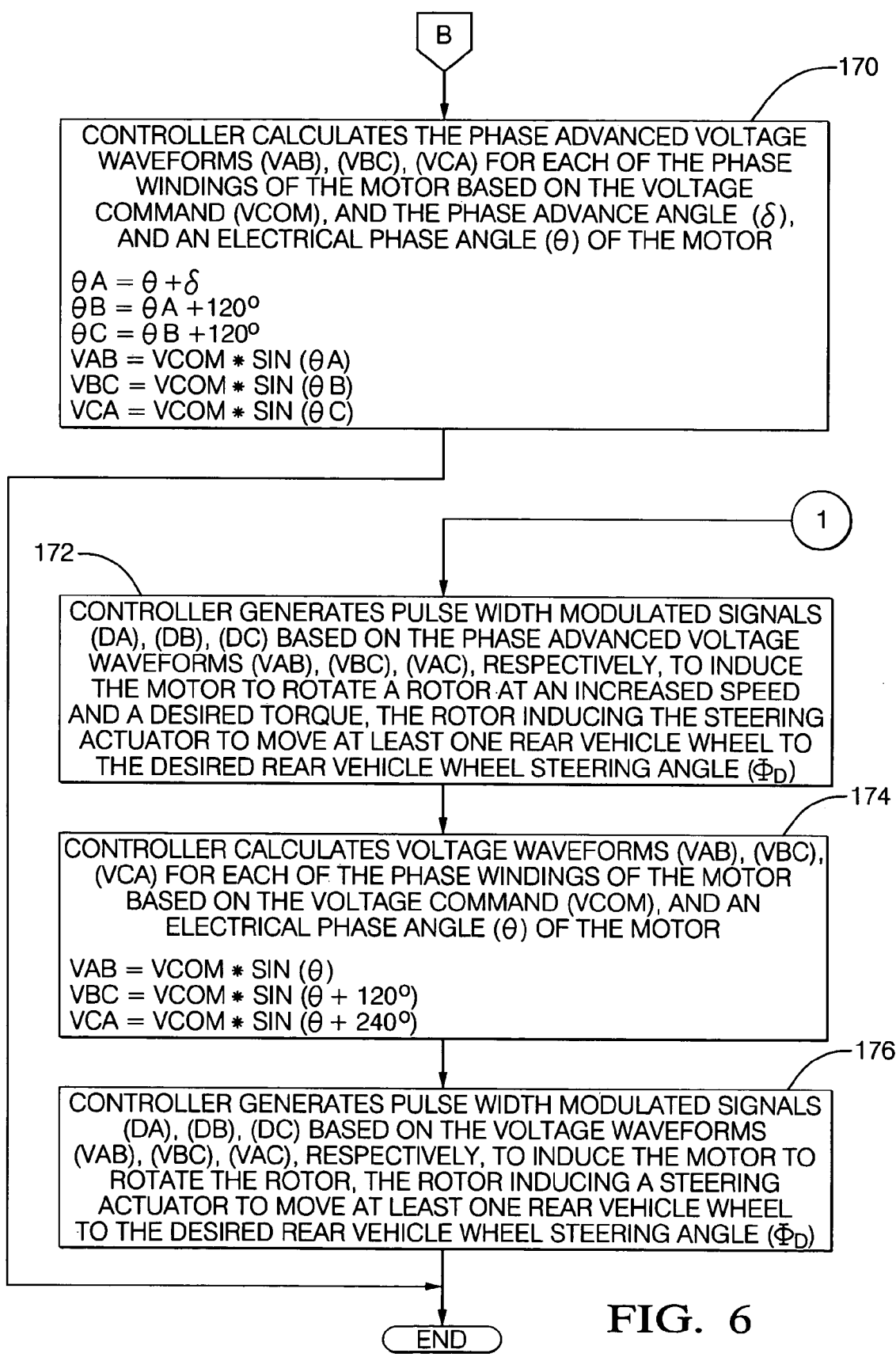

Referring to FIGS. 4–6, a method for controlling a steering position of at least one rear wheel of the vehicle 10 will now be explained. In the illustrated embodiment, the controller 16 includes computer software stored in at least one memory for executing steps corresponding to the following method. An advantage of the method is that during predetermined operating conditions, the controller 16 can phase advance voltage waveforms applied to the motor 60 to increase a rotational speed of the motor 60 which results in the wheels 94, 96 being moved toward a desired rear vehicle wheel steering angle ($\Phi_D$) more quickly.

At step 140, the controller 16 determines a desired rear vehicle wheel angle ($\Phi_D$) based on a position of a steering wheel 38 and a vehicle speed. It should be noted that a plurality of additional vehicle parameters can be utilized to determine the desired rear vehicle wheel steering angle ($\Phi_D$).

At step 142, the controller 16 receives a signal indicative of a measured rear vehicle wheel steering angle ($\Phi_M$) from the rear wheel steering angle sensor 104.

At step 144, the controller 16 calculates a position error value (PERR) based on the desired rear vehicle wheel steering angle ($\Phi_D$) and the measured rear vehicle wheel steering angle ($\Phi_M$). In particular, the controller 16 calculates the position error value (PERR) utilizing the following equation:

$$PERR = \Phi_D - \Phi_M.$$

At step 146, the controller 16 calculates a spring direction of a rear wheel alignment spring 82 based on the desired rear vehicle wheel steering angle ($\Phi_D$) and the measured rear vehicle wheel steering angle ($\Phi_M$).

At step 148, the controller 16 makes a determination as to whether movement from desired wheel steering angle ($\Phi_D$) to the measured wheel steering angle ($\Phi_M$) would be in a direction opposite a biasing direction of rear wheel alignment spring 82. If the value of step 148 equals "yes", the method advances to step 150. Otherwise, the method advances to step 152.

At step 150, the controller 16 calculates a voltage command (VCOM) based on a first gain function (G1), the voltage command (VCOM) having a sign indicated by the position error value (PERR). The sign of the position error value (PERR) can either be a plus (i.e., "+") sign or a negative (i.e., "−") sign. It should be noted that the first gain function (G1) can be mathematically represented as a quadratic function having a plurality of vehicle operational variables.

At step 152, the controller 16 makes a determination as to whether movement from desired wheel angle ($\Phi_D$) to measured wheel angle ($\Phi_M$) would be in a same direction as a biasing direction of rear wheel alignment spring 82. If the value of step 152 equals "yes", the method advances to step 154. Otherwise, the method advances to step 156.

At step 154, the controller 16 calculates a voltage command (VCOM) based on a second gain function (G2), the voltage command (VCOM) having a sign indicated by the position error value (PERR). The second gain function (G2) can be mathematically represented as a quadratic function having a plurality of vehicle operational variables.

At step 156, the controller 16 calculates a maximum voltage (VMAX) that can be supplied by a voltage source 98 to the motor 60. In particular, controller 16 calculates the maximum voltage (VMAX) based on the following equation:

$$VMAX = (Ke^* \omega m + Im\ ax^* R^* \sqrt{3/4^*(1+\omega e^*L/R)^2})$$

where

Ke corresponds to a motor constant;

ωm corresponds to a rotational speed of a rotor of the motor;

ωe corresponds to an frequency of a voltage waveform being applied to a phase winding of the motor;

Imax corresponds to a maximum current that can be supplied by the voltage source;

R corresponds to a resistance associated with the motor; and

L corresponds to an inductance associated with the motor.

It should be noted that the value of (Ke*ωm) is indicative of a back emf voltage generated in a phase winding. Further, the value of (Im ax*R*√3/4*(1+ωe*L/R)²) is indicative of a maximum voltage loss across a phase winding when a maximum output current (Imax) is flowing through the phase winding.

At step 158, the controller 16 makes a determination as to whether the voltage command (VCOM) is greater than the maximum voltage (VMAX). If the value of step 158 equals "yes", the method advances to step 160. Otherwise, the method advances to step 162.

At step 160, the controller 16 sets the voltage command (VCOM) equal to the value (VMAX). In other words, the controller 16 limits the commanded voltage command to a maximum voltage that can be provided to the phase windings of the motor 60 by the voltage source 98.

At step 162, the controller 16 calculates a modulation index value (MI) based on the battery voltage (VBAT) and the voltage command (VCOM). In particular, the controller 16 calculates the modulation index value MI utilizing the following equation:

$$MI = VCOM/VBAT$$

At step 166, the controller 16 determines whether the motor 60 is in a motoring mode of operation based on a sign of the voltage command (VCOM) and a direction of rotation of the rotor 62 of the motor 60, wherein phase advancing voltage waveforms applied to the phase windings in the motor 60 would result in increased rotational speed at a desired torque. If the value of step 166 equals "yes", the method advances to step 168. Otherwise, the method advances to step 174.

At step 168, the controller 16 calculates a phase advance angle ($\delta$) by solving the following equation where the only unknown value is the phase advance angle ($\delta$):

$$(|MI|=\cos\delta+(\omega e*L/R*\sin\delta))$$

wherein a value of $\delta$ is less than or equal to a value ($\delta$MAX) determined using the following equation: $\delta\text{MAX}=\tan^{-1}(\omega e*L/R)$. By having an upper limit of the phase advance angle $\delta$ being equal to $\delta$MAX, the phase advance angle ($\delta$) is maintained within the range of 0–90°. The foregoing equation can be solved explicitly or can be solved implicity using a numerical algorithm such as an interval bisection method for example.

At step 170, the controller 16 calculates the phase advanced voltage waveforms (VAB), (VBC) (VCA) for the phase windings 64, 66, 68, respectively, of the motor 60 based on the voltage command (VCOM), and the phase advance angle ($\delta$), and an phase angle ($\theta$) of the motor. In particular, the controller 16 calculates the phase angles for each of the waveforms (VAB), (VBC) (VCA) utilizing the following equations:

$$\theta A = \theta + \delta$$

$$\theta B = \theta A + 120$$

$$\theta C = \theta B + 120$$

Thereafter, the controller 16 calculates the phase advanced sinusoidal voltage waveforms (VAB), (VBC) (VCA), utilizing the following equations:

$$VAB = VCOM*SIN(\theta A)$$

$$VBC = VCOM*SIN(\theta B)$$

$$VCA = VCOM*SIN(\theta C).$$

It should be noted that after the phase advanced sinusoidal waveforms (VAB), (VBC) (VCA) are pulse-width modulated and are applied to phase windings of the motor 60, a back emf voltage in each phase winding is substantially in phase with an electrical current in the phase winding, which induces the motor 60 to increase a rotational speed of the rotor 62.

At step 172, the controller 16 generates pulse-width modulated signals (DA, (DB), (DC) based on the phase advanced sinusoidal voltage waveforms (VAB), (VBC), (VCA), respectively, to induce the motor 60 to rotate the rotor 62 at an increased speed having a desired torque. The rotor 62 induces a steering actuator to move at least one of the rear vehicle wheels 94, 96 to the desired rear vehicle wheel steering angle ($\Phi_D$). In the illustrated embodiment, the steering actuator comprises the steering rack 82. In an alternate embodiment, the steering actuator can comprise any device capable of moving at least one of the wheels 94, 96 about a steering axis associated with the wheel. After step 172, the method is exited.

At step 174, the controller 16 determines the sinusoidal voltage waveforms (VAB), (VBC) (VCA) for phase windings 64, 66, 68, respectively, of the motor 60 based on the voltage command (VCOM), and an phase angle ($\theta$) of the motor 60. In particular, the controller 16 determines the voltage waveforms (VAB), (VBC) (VCA), utilizing the following equations:

$$VAB = VCOM*SIN(\theta)$$

$$VBC = VCOM*SIN(\theta+120°)$$

$$VCA = VCOM*SIN(\theta+240°)$$

At step 176, the controller 16 generates pulse-width modulated signals (DA, (DB), (DC) based on the voltage waveforms (VAB), (VBC), (VCA), respectively, to induce the motor 60 to rotate the rotor 62. The rotor 62 inducing a steering actuator to move at least one rear vehicle wheel to the desired rear vehicle wheel steering angle ($\Phi_D$). After step 176, method is exited.

Figure 7:
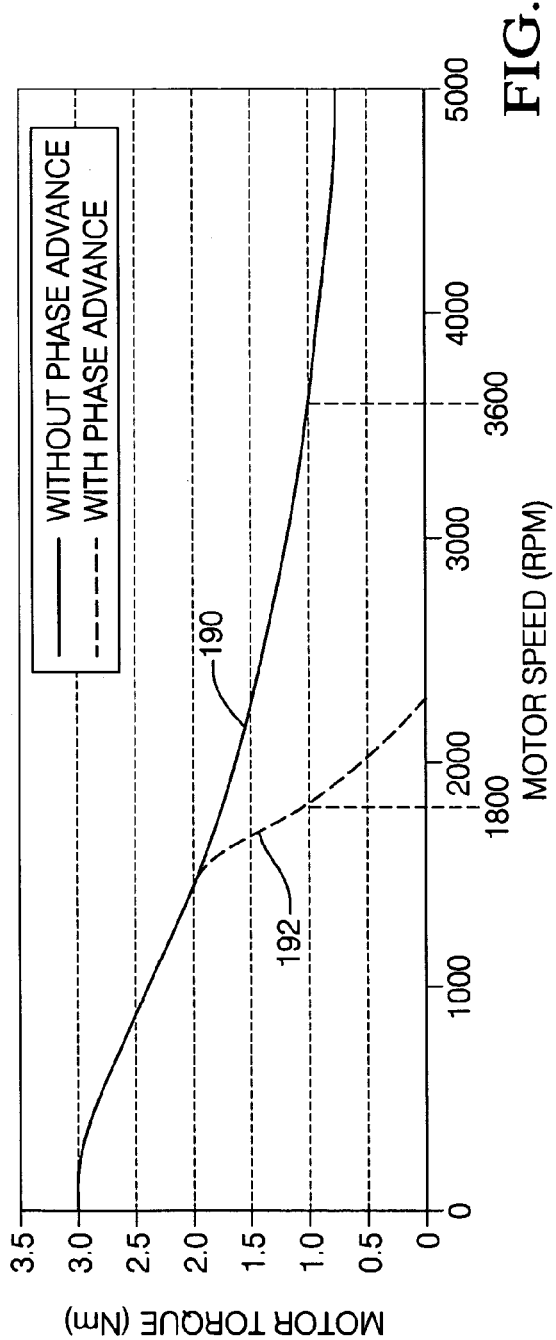
FIG. 7 is a plot indicating operation of a motor of the rear steering system of FIG. 3 with phase advance operation and without phase advance operation.

Referring to FIG. 7, an exemplary motor-torque versus motor-speed plot that indicates a predicted operation of the motor 60 is illustrated. The curve 190 indicates the operation of the motor 60 when the voltage waveforms applied to the phase windings of the motor 60 are phase advanced. As shown, the rotational speed of the motor 60 is within the range of 0–5000 rpm when phase advancing the voltage waveforms in accordance with exemplary embodiment. In contrast, the curve 192 indicates the operation of the motor 60 when the voltage waveforms applied to the phase windings of motor 60 are not phase advanced. With no phase advancing, a rotational speed of the motor 60 is within a range of 0–2200 rpm. Thus, one skilled in the art will recognize that phase advancing the voltage waveforms applied to the phase windings of the motor 60 allows a rotational speed of the motor 60 to be dramatically increased. As a result, a speed of movement of the wheels 94, 96 toward a desired rear vehicle wheel steering angle ($\Phi_D$) is increased.

Figure 8:
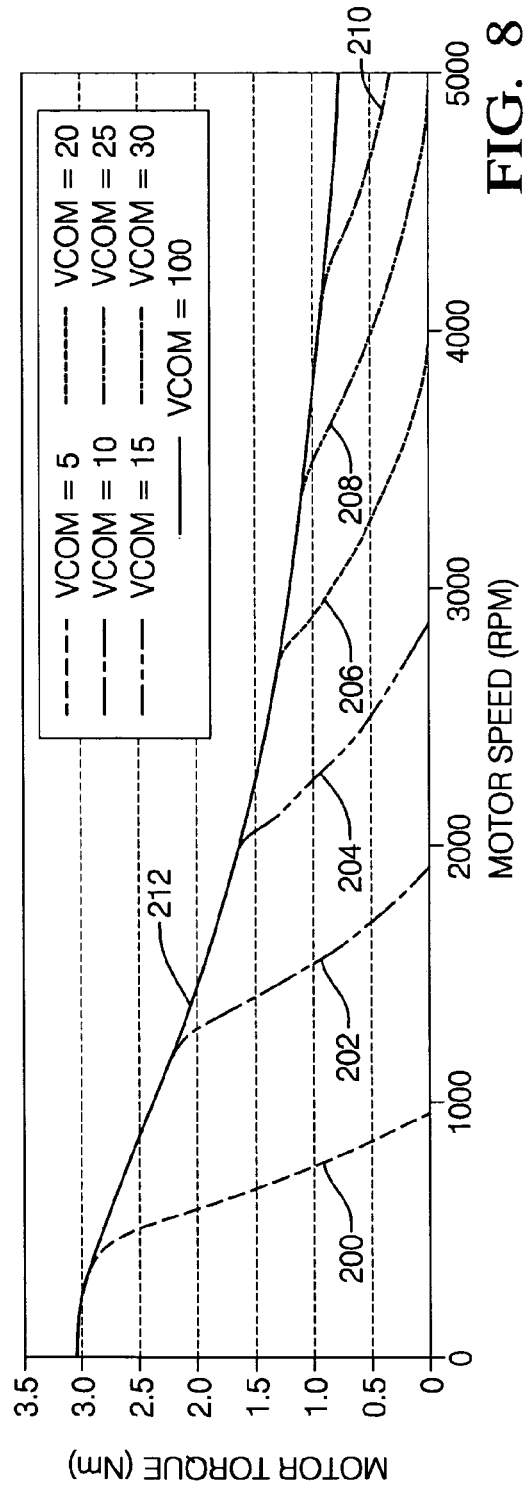
FIG. 8 is a plot indicating operation of the motor of the rear steering system of FIG. 3 with phase advance operation.

Referring to FIG. 8, an exemplary motor-torque versus motor-speed plot that indicates a predicted operation of motor 60 with varying voltage commands (VCOM) is illustrated. It particular, the plot illustrates operational curves 200, 202, 204, 206, 208, 210, 212 associated with a voltage command of 5 volts, 10 volts, 15 volts, 20 volts, 25 volts, 30 volts, 100 volts, respectively. Thus, the plot indicates that as a value of the voltage command increases, the motor speed ($\omega$m) also increases.

The system and the method for controlling a steering position of the least one rear wheel of a vehicle provide a substantial advantage over other systems and methods. In particular, the system and method provide a technical effect of phase advancing voltage waveforms applied to a motor of a rear steering system to increase a turning speed of a rear wheel about a steering axis toward a desired rear wheel steering angle.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

We claim:

1. A method for controlling a steering position of at least one rear wheel of a vehicle, the vehicle having both a brushless electric motor with a plurality of electrical phase windings and a steering actuator, the brushless electric motor having a rotor configured to drive the steering actuator, the steering actuator being operably coupled to at least one rear vehicle wheel, comprising:
   determining a desired voltage value indicative of about one-half of a peak-to-peak voltage to be applied to each of the plurality of electrical phase windings of the brushless electric motor based on a desired rear vehicle wheel steering angle and a measured rear vehicle wheel steering angle;
   determining when the desired voltage value is greater than a threshold voltage level;
   calculating a phase advance angle based on at least the desired voltage value and the threshold voltage level; and
   phase advancing a plurality of voltage waveforms applied to the plurality of electrical phase windings, wherein each phase advanced voltage waveform is phase advanced an amount substantially equal to the phase advance angle, wherein phase advancing the voltage waveforms increases a speed of the rotor at a desired torque to thereby increase a speed at which the steering actuator moves at least one rear vehicle wheel toward the desired rear vehicle wheel steering angle.

2. The method of claim 1, wherein the threshold voltage level is indicative of a substantially maximum voltage level that can be supplied by a voltage source supplying a voltage to the brushless electric motor.

3. The method of claim 1, wherein the phase advance angle is within a range of 0–90 electrical degrees.

4. The method of claim 1, wherein the phase advance angle is further based on a frequency of at least one of the plurality of voltage waveforms.

5. The method of claim 1, wherein a back emf voltage waveform in an electrical phase winding is substantially in phase with an electrical current in the electrical phase winding induced by a voltage waveform, after said phase advancing.

6. The method of claim 1, further comprising:
   determining a back emf voltage value associated with at least one electrical phase winding of the electric motor;
   determining a voltage loss value indicative of a voltage loss in least one electrical phase winding; and
   maintaining the desired voltage value at a value less than or equal to a sum of back emf value and the voltage loss value during the phase advancing of the voltage waveforms.

7. The method of claim 1, wherein the plurality of voltage waveforms comprise a plurality of sinusoidal voltage waveforms.

8. A system for controlling a steering position of at least one rear wheel of a vehicle, comprising:
   a brushless electric motor having a plurality of electrical phase windings and a rotor;
   an actuator operably coupled to the brushless electric motor, wherein the actuator is configured to move at least one rear vehicle wheel in response to rotation of the rotor of the brushless electric motor;
   an inverter circuit configured to energize the plurality of electrical phase windings in the brushless electric motor; and
   a controller operably coupled to the inverter circuit, the controller configured to determine a desired voltage value indicative of about one-half of a peak-to-peak voltage to be applied to each of the plurality of electrical phase windings of the brushless electric motor based on a desired rear vehicle wheel steering angle and a measured rear vehicle wheel steering angle, the controller further configured to determine when the desired voltage value is greater than a threshold voltage level, the controller further configured to calculate a phase advance angle based on at least the desired voltage value and the threshold voltage level, the controller further configured to induce the inverter circuit to phase advance a plurality of voltage waveforms applied to the plurality of electrical phase windings, wherein each phase advanced voltage waveform is phase advanced an amount substantially equal to the phase advance angle, wherein phase advancing the voltage waveforms increases a speed of the rotor at a desired torque to thereby increase a speed at which the steering actuator moves at least one rear vehicle wheel toward the desired rear vehicle wheel steering angle.

9. The system of claim 8, wherein the threshold voltage level is indicative of a substantially maximum voltage level that can be supplied by a voltage source supplying a voltage to the brushless electric motor.

10. The system of claim 8, wherein the phase advance angle is within a range of 0–90 electrical degrees.

11. The system of claim 8, wherein the phase advance angle is further based on a frequency of at least one of the plurality of voltage waveforms.

12. The system of claim 8, wherein a back emf voltage waveform in an electrical phase winding is substantially in phase with an electrical current in the electrical phase winding induced by a voltage waveform, after said phase advancing.

13. The system of claim 8, wherein the computer is further configured to determine a back emf voltage value associated with at least one electrical phase winding of the electric motor, the computer further configured to determine a voltage loss value indicative of a voltage loss in least one electrical phase winding, the computer further configured to maintain the desired voltage value at a value less than or equal to a sum of back emf value and the voltage loss value during the phase advancing of the voltage waveforms.

14. The system of claim 8, wherein the plurality of voltage waveforms comprise a plurality of sinusoidal voltage waveforms.

15. An article of manufacture, comprising:
a computer storage medium having a computer program encoded therein for controlling a steering position of at least one rear wheel of a vehicle, the vehicle having both a brushless electric motor with a plurality of electrical phase windings and a steering actuator, the brushless electric motor having a rotor configured to drive the steering actuator, the steering actuator being operably coupled to at least one rear vehicle wheel, the computer storage medium comprising:
code for determining a desired voltage value indicative of about one-half of a peak-to-peak voltage to be applied to each of the plurality of electrical phase windings of the brushless electric motor based on a desired rear vehicle wheel steering angle and a measured rear vehicle wheel steering angle;
code for determining when the desired voltage value is greater than a threshold voltage level;
code for calculating a phase advance angle based on at least the desired voltage value and the threshold voltage level; and
code for phase advancing a plurality of voltage waveforms applied to the plurality of electrical phase windings, wherein each phase advanced voltage waveform is phase advanced an amount substantially equal to the phase advance angle, wherein phase advancing the voltage waveforms increases a speed of the rotor at a desired torque to thereby increase a speed at which the steering actuator moves at least one rear vehicle wheel toward the desired rear vehicle wheel steering angle.

16. The article of manufacture of claim 15, wherein the threshold voltage level is indicative of a substantially maximum voltage level that can be supplied by a voltage source supplying a voltage to the brushless electric motor.

17. The article of manufacture of claim 15, wherein the phase advance angle is within a range of 0–90 electrical degrees.

18. The article of manufacture of claim 15, wherein the phase advance angle is further based on a frequency of at least one of the plurality of voltage waveforms.

19. The article of manufacture of claim 15, wherein a back emf voltage waveform in an electrical phase winding is substantially in phase with an electrical current in the electrical phase winding induced by a voltage waveform, after said phase advancing.

20. The article of manufacture of claim 15, wherein the computer storage medium further comprises:
code for determining a back emf voltage value associated with at least one electrical phase winding of the electric motor;
code for determining a voltage loss value indicative of a voltage loss in least one electrical phase winding; and
code for maintaining the desired voltage value at a value less than or equal to a sum of back emf value and the voltage loss value during the phase advancing of the voltage waveforms.

* * * * *